United States Patent Office 3,351,811
Patented Nov. 7, 1967

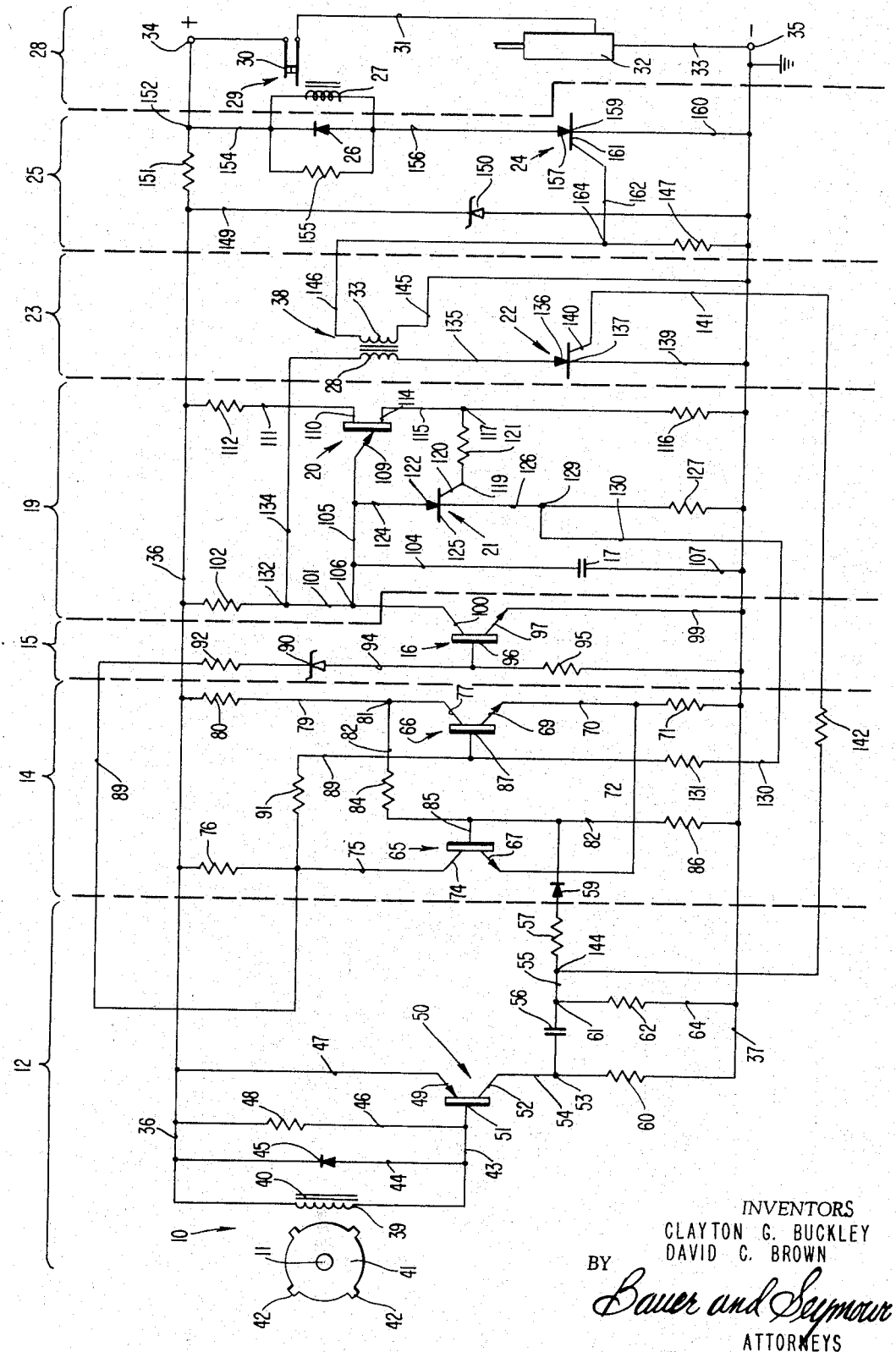

3,351,811
SPEED RESPONSIVE APPARATUS
Clayton G. Buckley, Unadilla, and David C. Brown, Sidney, N.Y., assignors to The Bendix Corporation, Sidney, N.Y., a corporation of Delaware
Filed Jan. 15, 1962, Ser. No. 166,306
10 Claims. (Cl. 317—5)

This invention relates to speed responsive apparatus, and particularly relates to apparatus which is responsive to and controls the speed of variable speed mechanism.

The invention has among its objects the provision of novel speed responsive apparatus which is particularly characterized by its accuracy.

A further object of the invention lies in the provision of speed responsive apparatus of the type indicated which operates satisfactorily and maintains a high degree of accuracy while operating under widely varying ambient temperature conditions.

Still another object of the invention lies in the provision of speed responsive apparatus which is rugged and reliable in operation despite its subjection to high temperatures during operation.

A still further object of the invention is the provision of the novel combination of speed responsive apparatus of the type indicated and means controlled by the speed responsive apparatus for stopping the energization of the variable speed means, the speed of which is detected by the speed responsive apparatus.

The above and further objects and novel features of the invention will more fully appear from the following description when the same is read in connection with the accompanying drawing. It is to be expressly understood, however, that the drawing is for the purpose of illustration only, and is not intended as a definition of the limits of the invention.

The sole figure of the drawing is a wiring diagram of the speed responsive apparatus and of the mechanism controlling means associated therewith, certain parts of the speed responsive apparatus being shown schematically.

The speed responsive apparatus herein specifically disclosed is adapted for use as an overspeed cut-off for aircraft starters, the apparatus opening the electrical circuit controlling the starter when a shaft of the starter reaches a predetermined speed. Although the speed responsive apparatus of the invention is described herein in its application as an overspeed cut-off for aircraft starters, it is to be understood that such apparatus may be employed for a number of other purposes. In one embodiment of electrically controlled aircraft starter, it is required that the overspeed cut-off shall open a one ampere, 30 volt, inductive circuit when a shaft speed of 2,900 r.p.m. is reached. For such starter a speed tolerance of ±1.7% is specified.

Mechanically operated overspeed cut-offs are prone to inaccuracy and to variations in operation with changes in temperature. The speed responsive apparatus of the present invention, on the other hand, being almost wholly electrical in nature, may be made to maintain its initial accuracy despite variation of ambient temperature throughout a wide range, for example, —65° F. to 160° F., and despite the subjection of the apparatus to elevated temperatures, on the order of 250° F., by reason of the heat of the engine with which the apparatus is associated.

Turning now to the drawing, the illustrative system will first be described generally as to the main functions and interactions of its parts, and then will be specifically described. The apparatus shown includes a speed responsive means 10 which generates pulses which are spaced at time intervals which vary inversely with the speed of the element being controlled, in this instance a shaft 11 which is driven in synchronism with the main shaft of an electrically controlled aircraft starter driven by a compressed air motor. Such pulses are fed to an amplifier and shaper circuit generally designated 12 which removes one-half of the pulses generated by means 10 and which forwards the resulting unidirectional pulses to a bistable flip-flop circuit generally designated 14. Associated with the flip-flop circuit in a first switching circuit generally designated 15 is a normally closed switching device 16 in the form of a transistor which is disposed in shunt relationship with a condenser 17, such condenser being connected, in series with a limiting resistor, across a constant voltage source of direct current. Condenser 17, which is part of a constant interval timing circuit generally designated 19, is periodically charged from such current source by the opening of switching device 16, which is under the control of speed responsive device 10 and circuit portions 12, 14, and 15. Condenser 17 charges to a predetermined breakdown voltage of a unijunction transistor 20 which is interposed in a first discharge circuit for the condenser. Thereupon a normally non-conducting silicon controlled rectifier 21 interposed in a branch condenser discharge circuit is rendered conductive further to discharge condenser 17. The time interval from the beginning of the charging of condenser 17 to its full discharge is a constant; the interval between successive condenser-charging and discharging cycles, however, varies inversely with the speed of shaft 11.

Current discharged from condenser 17 also flows into a third circuit 23 in which there are interposed in series the primary 28 of an output transformer and a second silicon controlled rectifier 22 which constitute an AND circuit. Discharge of current through such further circuit 23 does not take place, however, unless the triggering means or gate of silicon controlled rectifier 22 is energized at the same time as there is a charge upon condenser 17. The triggering means of silicon controlled rectifier 22 is energized by pulses from shaper and amplifier circuit 12, so that primary 28 is energized only if at least a portion of the pulse from circuit portion 12 coincides in time with existence of a charge upon condenser 17. Such condition begins to exist, upon an increase in speed of shaft 11, only when the speed of such shaft increases to a value very close to the desired predetermined value, that is, until a condition is reached at which a succeeding pulse generated by means 10 and circuit portion 12 overlaps in time the charged condition of condenser 17 which was initiated by the immediately preceding pulse.

When such condition is reached, current flows through primary 28. Such current flow in the primary 28 induces voltage in the secondary 33 of the transformer, thereby energizing the triggering means or gate of a third silicon controlled rectifier 24 disposed in a second switching circuit generally designated 25. Device 24 is disposed in series with a resistor 155 across the source of direct current supply of the system. Thus upon energization of the triggering means of switching device 24 a current will flow through such device 24. Because such current flow is steady and uninterrupted, it continues after the energization of the gate of device 24 has ceased. The coil 27 of a relay 29, disposed in a starter motor controlling circuit generally designated 28', is connected in parallel with resistor 155 and is energized by the current source for the system upon the rendering of device 24 conductive. In the illustrative embodiment the contacts 30 of the relay 29 are closed when relay coil 27 is deenergized.

In the embodiment shown, contacts 30 are interposed in a further circuit, powered by source 34, 35, which includes a solenoid 32. The plunger of the solenoid is spring biased, and is connected to an electromagnetic valve (not shown) which controls the aircraft engine starter so that when the solenoid is deenergized, as by the opening of contacts 30, the spring biased plunger of the solenoid closes the valve; when the solenoid is energized by the closing of contacts 30, the solenoid plunger opens such valve to energize the starter motor.

The speed responsive device is powered by a direct current source which is connected to a positive terminal 34 and a negative terminal 35. The current source may be, for example, a battery and may have, for example, an effective voltage at terminals 34 and 35 of between 18 and 30 volts. Connected to terminal 34 is a bus wire 36; connected to terminal 35 is another bus wire 37. Bus wires 36 and 37 serve as the source of power for the system with the exception of the pulses delivered thereto by the speed responsive means 10; wires 36 and 37 also serve as the source of power to energize solenoid 32.

The circuit includes a zener diode 150 which is interposed in a wire 149 connected between wire 36, at a point beyond current-limiting resistor 151, and bus wire 37, as shown. Diode 150 insures that the voltage between the bus wires at such point shall not exceed a predetermined desired value.

*Speed responsive means 10*

The speed responsive means 10 includes a pickup coil 39 having a core in the form of a permanent magnet 40. One end of coil 39 is connected to bus wire 36, as shown. The other end of coil 39 is connected to bus wire 37 by means of a wire 43, a transistor 50, a wire 54, and a resistor 60, all to be described.

A triggering wheel 41 affixed to shaft 11 has four equally angularly spaced vanes 42 projecting from the periphery thereof. Such vanes, which are made of magnetic metal, cut the lines of force of the magnetic field of core 40 as they pass through such field upon rotation of the wheel 41 with shaft 11. The wheel 41, its vanes 42, the coil 39, and the core 40 thus function as an alternating current generator, the frequency of the alternating current produced by such generator being directly propotional to the speed of shaft 11. In the described embodiment, the speed of rotation of shaft 11 is such that, taken with the number of vanes 42 on the wheel, the generator of speed responsive means 10 produces alternating current with a frequency of 193 cycles per second when the main shaft of the engine starter rotates at 2,900 r.p.m.

*Amplifier and shaper circuit 12*

Circuit 12 includes means for removing the positive half of the voltage from the alternating current generated by speed responsive means 10 and impresses the remaining negative pulses upon the base of a PNP type transistor 50. A wire 44 having a diode 45 interposed therein is shunted across coil 39, as shown, to accomplish such result. Wire 43 is connected to base 51 of transistor 50, thereby imposing the resulting negative pulses upon such base. A base-biasing resistor 48, interposed in a wire 46, is connected between bus wires 36 and 37 beyond wire 44. The emitter 49 of transistor 50 is connected to bus wire 36 by wire 47. A collector 52 of such transistor is connected to bus wire 37 by wire 54 in which the resistor 60, which may, for example, have a resistance of 10K ohms, is interposed. It will be seen from the above that transistor 50 is non-conducting when no negative pulse is applied to its base 51, and that such transistor conducts, allowing current to flow therethrough from wire 47 into wire 54, when a negative pulse is imposed upon base 51 of the transistor.

Connected to wire 54 at a junction 53 in advance of resistor 60 is a wire 55 which leads to the flip-flop circuit 14, to be described. Interposed in wire 55 in that order from junction 53 are a condenser 56, which may, for example, have a capacity of 0.02 mfd.; a resistor 57, which may, for example, have a resistance of 1.8K ohms; and a diode 59. A wire 64 having a resistor 62 interposed therein is connected from a junction 61 between condenser 56 and resistor 57 and bus wire 37. Beyond diode 59, wire 55 is connected to a wire 82 leading to a base 85 of a first transistor 65 in the flip-flop circuit 14. As shown, transistor 65 is of the NPN type. Wire 82 is connected to bus wire 37 through an interposed resistor 86, which may have, for example, a resistance of 8.2K ohms.

When no signals are emitted by the sped responsive device 10, the transistor 50 is thus non-conducting. Condenser 56 has no charge upon it, and the IR drop across resistor 86 is blocked by the diode 59. When, however, a signal is transmitted by means 10 and transistor 50 thus becomes conductive, full bus voltage appears across resistor 60. Condenser 56 then charges quickly through resistor 62. As condenser 56 charges, the voltage across resistor 62 decreases to 0. Thus the input pulse from transistor 50 causes substantial voltage, on the order of 12 volts in the described system, to appear briefly at junction 61. Such last named pulse, transmitted to the flip-flop circuit through wire 55, drives base 85 of transistor 65 of the flip-flop circuit. When transistor 50 ceases to conduct and condenser 56 discharges through resistors 60 and 62, the voltage at junction 61 is kept low by the voltage divider effect of resistors 60 and 62.

*The flip-flop circuit 14*

Flip-flop circuit 14 includes the above-described transistor 65 and a second similar transistor 66, the emitters 67 and 69 of transistors 65 and 66, respectively, being connected by wires 70 and 72. Wire 70 is connected to bus wire 37 by a resistor 71 of relatively low value, for example, 0.39K ohms. The collector 74 of transistor 65 is connected to bus wire 36 through a wire 75 having a resistor 76 interposed therein. Resistor 76 may have, for example, a resistance of 3.3K ohms. The collector 77 of transistor 66 is connected to the bus wire 36 by a wire 79 having a resistor 80 interposed therein, resistor 80 having the same resistance value as resistor 76. Wire 82 continues past the base 85 of transistor 65 to a junction 81 with wire 79, there being a resistor 84 of relatively high resistance interposed in such latter portion of the wire 82. Resistor 84 may have, for example, a resistance of 12K ohms. The base 87 of transistor 66 is connected by a wire 89 to wire 75 which extends to the collector 74 of transistor 65. Interposed in wire 89 in advance of such junction is a resistor 91 which may have the same resistance as that of resistor 84.

The flip-flop circuit 14 is bistable. When bus wires 36 and 37 are energized, but no signal is being emitted by speed responsive means 10, the transistor 66 is conductive and transistor 65 is non-conductive. The emitters of both such transistors, in the described embodiment, would be about 2 volts above ground, due to the IR drop in resistor 71. The collector 77 of transistor 66 would then be about 2 volts above ground, which does not supply any base drive to transistor 65; transistor 65 thus remains non-conductive. The collector 74 of transistor 65 is then about 12 volts above ground, such collector supplying sufficient voltage through resistor 91 to the base 87 of transistor 66 to keep the latter transistor conductive.

When shaft 11 starts to rotate, and a positive pulse is applied to the flip-flop circuit through wire 55 and diode 59, the positive pulse drives the base 85 of transistor 65 positive. Transistor 65 then becomes conductive, causing the voltage of its collector 74 to drop markedly, in the illustrative embodiment the voltage dropping to about 2 volts. This removes the base drive of transistor 66, which then becomes non-conducting. The voltage of collector 79 of transistor 66 rises to about 12 volts, such potential being applied to the base 85 of transistor 65 through resistor 84, thus keeping transistor 65 in a conductive state.

*First switching circuit 15*

This portion of the circuit includes a wire 94 connected to bus wire 37, there being connected in series relationship and interposed in the wire a resistor 95 of relatively high value, a zener diode 90, and a resistor 92 of relatively high value. Resistor 95 in the illustrative embodiment has a resistance of 10K ohms, whereas resistor 92 has a resistance of 12K ohms. The zener diode 90 has a breakdown voltage which is somewhat above a potential of the collector 74 of transistor 65 when such transistor is conductive. In the illustrative embodiment, a zener diode 90 has a breakdown voltage of 4 volts. A wire 89 connects the end of resistor 92 remote from the diode to the junction between wires 75 and 89, as shown.

Also included as a part of circuit portion 15 is the transistor 16 which is connected in shunt relationship with the condenser 17 in the timing circuit. Transistor 16, which is of the NPN type, is conductive when transistor 66 conducts, and is non-conductive when transistor 65 conducts. The base 96 of transistor 16 is connected to wire 94 between the resistor 95 and the diode 90, as shown. Emitter 97 of transistor 16 is connected to bus wire 37 by a wire 99. Collector 100 of transistor 16 is connected to bus wire 36 by a wire 101 having a resistor 102 of relatively large value interposed therein. In the illustrative embodiment, resistor 102 has a resistance of 15K ohms.

When the transistor 65 is conducting, the potential of its collector 74 is below the break-down voltage of zener diode 90 so that no voltage is applied to base 96 of transistor 16. Accordingly, transistor 16 is then non-conducting.

Timing circuit 19

The timing circuit 19 includes the condenser 17, which in the illustrative embodiment has a capacity of 0.10 mfd. Condenser 17 has one terminal thereof connected to bus wire 37 by a wire 107. The other terminal of the condenser is connected by a wire 104 to a wire 105 which extends to a junction 106 with wire 101. When transistor 16 becomes non-conducting, the shunt circuit 101, 16, 99, 37, and 107 across condenser 17 is opened, so that the condenser now starts to charge through resistor 102, wires 101, 104, 105, and 107.

Wire 105 is connected to the emitter 109 of unijunction transistor 20. The base 2, designated 110, of transistor 20, is connected to bus wire 36 by a wire 111 in which a resistor 112 of relatively low resistance is interposed. In the embodiment described, resistor 112 has a resistance of .68K ohm. The base 1 of transistor 20, designated 114, is connected by a wire 115 through a resistor 116 of relatively small resistance to bus wire 37. In the illustrative embodiment, resistor 116 has a resistance of 0.15K ohm.

A wire 119 having a resistor 121 interposed therein extends from a junction 117 with wire 115 to the gate 120 of the silicon controlled rectifier 21. The anode 122 of such rectifier 21 is connected to wire 105 by a wire 124. The cathode 125 of rectifier 21 is connected to bus wire 37 by a wire 126 having a resistor 127 of relatively small value interposed therein. Resistor 127 in the illustrative embodiment has a resistance of 0.15K ohm.

When the charge on condenser 17 reaches the breakdown voltage of unijunction transistor 20, current flows in the circuit 104, 105, 20, 115, 121, 119. Such current flow energizes gate 120 of rectifier 21, thereby causing such rectifier to become conductive. The discharge of condenser 17 thus takes place initially through transistor 20 and then simultaneously through such transistor and rectifier 21. The rectifier insures that the condenser will become fully discharged at the end of each timing cycle.

The current flow in the circuit 124, 21, 126, and 127 is employed to turn transistor 66 back on, such action turning transistor 65 off. These functions are provided by connecting the base 87 of transistor 66 to wire 126 at a junction 129 therein by a wire 130 having an interposed resistor 131 of relatively high value. Resistor 131 in the described embodiment has a resistance of 8.2K ohms. When transistor 66 is thus turned back on, the low voltage on collector 77 thereof is insufficient to drive base 85 of transistor 65 positive so that transistor 65 is turned off. The potential of collector 74 of transistor 65 will then rise to about 12 volts, which exceeds the break-down voltage of zener diode 90. Accordingly, current then flows through resistors 92 and 95 thus making base 96 of transistor 16 positive. Transistor 16 then conducts so that condenser 17 is shunted and its charge held at 0. The timing circuit is now ready to start a new time cycle.

AND circuit 23

The AND circuit 23 includes a second silicon controlled rectifier 22. The anode 136 of rectifier 22 is connected to wire 101 by circuit means including a wire 134 which is connected between a junction 132 and one end of primary winding 28 of output transformer 38. The other end of primary winding 28 is connected to anode 136 by a wire 135. Cathode 137 of rectifier 22 is connected to bus wire 37 by a wire 139. The circuit 104, 105, 101, 134, 28, 135, 22, 139, 37, and 107 constitutes a further branch circuit through which condenser 17 may discharge when rectifier 22 has been rendered conductive. Gate 140 of rectifier 22 is connected by a wire 141 to the wire 55 which receives pulses which are generated and transmitted by the speed responsive means 10 and the circuit portion 12. Interposed in wire 141 is a resistor 142 which in the illustrative embodiment has a resistance of 2.7K ohms. Rectifier 22 thus conducts only when two conditions are simultaneously present: (1) the condenser 17 has a charge thereon and (2) gate 140 has been rendered positive by a pulse in wire 55. Thus current will flow in primary winding 28 of transformer 38 only when the condition of a charge on condenser 17, produced by a preceding pulse generated by means 10, overlaps in time a succeeding pulse generated by such means. Such condition is present only when shaft 11 reaches the predetermined desired speed at which the system of the invention is designed to operate to cut off the driving means for such shaft.

Upon a flow of current through primary winding 28 a voltage is induced in secondary winding 33 of output transformer 38. One end of winding 33 is connected to bus wire 37 by a wire 145; the other end of such secondary winding is connected to wire 37 by a wire 146 having a resistor 147 interposed therein. Resistor 147 in the illustrative embodiment has a resistance of 1.0K ohms.

The second switching circuit 25

This portion of the circuit includes a further switching device in the form of a silicon controlled rectifier 24. A wire 162 extends from a junction 164 on wire 146 to the gate 161 of rectifier 24. The anode 157 of rectifier 24 is connected by a wire 156 to resistor 155, the resistor in turn being connected to junction 152 on bus wire 36 by a wire 154. The resistor 155 is connected in shunt with the diode 26. Diode 26 suppresses inductive voltage transients when current ceases to flow in coil 27, to be described. The cathode 159 of rectifier 24 is connected to bus wire 37 by a wire 160. When current flows in wire 146 of transformer 38, gate 161 of rectifier 24 is energized so as to render such rectifier conductive. Thereupon current flows from bus wire 36 through rectifier 24 to bus wire 37.

Controlling circuit 28'

Connected in parallel with diode 26 and resistor 155 between wires 154 and 156 is the coil 27 of a relay 29. Relay 29 has contacts 30 which are closed when the relay coil is deenergized and which are opened when the relay coil is energized. The resistor 155, which in the described embodiment has a resistance of 0.68K ohm, insures a steady flow of current in the circuit 155, 156, etc., once rectifier 24 has been rendered conductive, despite the delay in build up of current through rectifier 24 which would be caused by the inductance of relay coil 27 if the resistor 155 were not employed. Because the current flow in the circuit 154, 156, etc., is steady and uninterrupted, once rectifier 24 has been made to conduct, the circuit remains conductive and the circuit remains energized despite the disappearance of voltage at gate 161 of rectifier 24.

The contacts 30 of relay 29 are interposed in the energizing circuit for the solenoid 32 of the starter motor controlling valve. Preferably the source of current 34, 35 is employed for the solenoid, a wire 31 having contacts 30 interposed therein being connected to terminal 34 and one end of the coil of solenoid 32, the other end of such coil being connected to terminal 35 by a wire 33.

It has been found that the use of output transformer 38 to couple silicon controlled rectifiers 22 and 24 produces a system which is much more reliable than if a conventional resistance coupling were employed between such rectifiers. If a resistor were put in the cathode circuit of rectifier 22, it would function with resistor 142 as a voltage divider so that signals from resistor 62 would develop a voltage acros the resistor employed to replace transformer 38 even if no signal were present at the anode of rectifier 22. If the coupling circuit employing a condenser were properly designed to fire rectifier 24 at −65° F., the spurious signal resulting from the above-described voltage divider effect would fire rectifier 24 falsely at 160° F. The system employing resistance coupling would thus require the addition of a zener diode thereto to prevent false signals from operating it. Even with the added zener diode, however, the operation of the resulting resistance coupled circuit would be less reliable than it is with the transformer 38.

It has been found that the illustrative embodiment of speed responsive device is highly accurate, and operates well within a tolerance of ±1.7%. The terminal points of the range of variation in cut-off speed of the system can be varied by appropriately changing the value of resistor 102. This value is selected for each system to compensate for tolerances in other components. Resistor 102 is reduced in resistance value to increase the cut-off speed of the system, the resistance of such resistor being increased to decrease the cut-off speed.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. Signal apparatus comprising a source of input signals having a variable interval between said signals, means responsive to said input signals for producing an electrical timing signal in response to each of said input signals, said timing signals being of substantially equal duration, and means responsive to a said timing signal and a said input signal to provide an output signal whenever the interval between two successive input signals of said source is a predetermined value less than the duration of said timing signal.

2. Signal apparatus comprising a source of first signals having a variable interval between said signals, first means successively responsive to said first signals to provide successive output second signals, each of said second signals having a constant duration, and second means responsive to said first and second signals to provide an output third signal whenever the succeeding signal of preceding and succeeding successive first signals is in time coincidence with the output second signal which is provided in response to the preceding signal of the two said successive first signals.

3. Signal apparatus according to claim 2 wherein said output third signal is provided only when the interval between two successive first signals is a predetermined value less than the duration of said second signal occurring during said interval.

4. Signal apparatus according to claim 2 wherein said second means comprises AND gate means having first and second inputs coupled to said source and said first means, respectively.

5. Signal apparatus according to claim 4 wherein said source comprises a variable interval pulse generator and wherein said first means comprises a bistable circuit having a first input coupled to said generator and a reset second input, said bistable circuit providing at the output thereof an output signal with mutually exclusive first and second levels in response to respective generator pulses and predetermined reset signals appearing at said first and second inputs, respectively, a condenser in a normally uncharged condition, a condenser charging circuit for charging said condenser to a predetermined charge level, a condenser discharging circuit for discharging said condenser to the aforesaid uncharged condition when the condenser is charged to said predetermined charge level, the charging and discharging cycle for said condenser being substantially equal to the aforesaid duration of the output second signal of said first means, semiconductor switching means for actuating said charging circuit, said switching means being responsive to the bistable circuit output signal having said first level, said circuit for discharging further having a sub-circuit responsive to the discharge therethrough to provide said predetermined reset signal, and a further circuit responsive to the discharge through said discharging circuit to provide said output second signal, said second input of said AND gate being coupled to the output of said further circuit.

6. Signal apparatus according to claim 5 further comprising utilization means responsive to said output third signal, said utilization means being inductively coupled to the output of said AND gate.

7. Signal apparatus for controlling the speed of a variable speed mechanism device, said apparatus comprising a source of first signals having a variable interval between said signals, said interval being inversely proportional to the speed of said device, first means successively responsive to said first signals to provide successive output second signals, each of said second signals having a constant duration, second means responsive to said first and second signals to provide an output third signal whenever the succeeding signal of preceding and succeeding successive first signals is in time coincidence with the output second signal which is provided in response to the preceding signal of the two said successive first signals, and means responsive to said output third signal for utilizing said third output signal to control the speed of said device.

8. Signal apparatus according to claim 7 wherein said second means comprises AND gate means having first and second inputs coupled to said source and said first means, respectively.

9. Signal apparatus according to claim 8 wherein said source comprises a variable interval pulse generator and wherein said first means comprises a bistable circuit having a first input coupled to said generator and a reset second input, said bistable circuit providing at the output thereof an output signal with mutually exclusive first and second levels in response to respective generator pulses and predetermined reset signals appearing at said first and second inputs, respectively, a condenser in a normally uncharged condition, a condenser charging circuit for charging said condenser to a predetermined charge level, a condenser discharging circuit for discharging said condenser to the aforesaid uncharged condition when the condenser is charged to said predetermined charge level, the charging and discharging cycle for said condenser being substantially equal to the aforesaid duration of the output second signal of said first means, semiconductor switching means for actuating said charging circuit, said switching means being responsive to the bistable circuit output signal having said first level, said circuit for discharging further having a sub-circuit responsive to the discharge therethrough to provide said predetermined reset signal, and a further circuit responsive to the discharge through said discharging circuit to provide said output second signal, said second input of said AND gate being coupled to the output of said further circuit.

10. Signal apparatus according to claim 9 wherein said utilization means is inductively coupled to the output of said AND gate.

References Cited

UNITED STATES PATENTS

| | | | |
|---|---|---|---|
| 1,663,890 | 3/1928 | Stoller | 317—5 X |
| 2,703,862 | 3/1955 | Gordon | 317—5 X |
| 2,941,120 | 6/1960 | Harman et al. | 317—5 |
| 2,970,228 | 1/1961 | White et al. | 317—148.5 |
| 2,982,920 | 5/1961 | Feissel | 317—5 X |
| 2,997,665 | 8/1961 | Sylvan | 307—88.5 |
| 3,037,158 | 5/1962 | Schmidt | 317—148.52 |
| 3,062,988 | 11/1962 | Fitch et al. | 317—5 |
| 3,075,136 | 1/1963 | Jones | 307—88.5 |
| 3,184,606 | 5/1965 | Ovenden et al. | |

MILTON O. HIRSHFIELD, *Primary Examiner.*

SAMUEL BERNSTEIN, MAX L. LEVY, *Examiners.*

D. YUSKO, R. V. LUPO, *Assistant Examiners.*